United States Patent [19]

Krikor et al.

[11] Patent Number: 4,502,114

[45] Date of Patent: Feb. 26, 1985

[54] CIRCUIT FOR RELIABLE DATA TRANSFER BETWEEN TWO CENTRAL PROCESSING UNITS

[75] Inventors: Krikor A. Krikor, Glendale; Kuang-Cheng Hu, Phoenix, both of Ariz.

[73] Assignee: GTE Automatic Electric Incorporated, Northlake, Ill.

[21] Appl. No.: 437,647

[22] Filed: Oct. 29, 1982

[51] Int. Cl.³ .............................................. G06F 15/16
[52] U.S. Cl. .................................................... 364/200
[58] Field of Search ............................... 364/200, 900

[56] References Cited

U.S. PATENT DOCUMENTS 3,638,195   1/1972   Brender et al. ................... 364/200
4,365,295  12/1982   Katzman et al. ................. 364/200

Primary Examiner—Gareth D. Shaw
Assistant Examiner—Ronni S. Malamud
Attorney, Agent, or Firm—Frank J. Bogacz; Peter Xiarhos

[57] ABSTRACT

This circuit provides a minimally sized data transfer buffer interface between two central processing units for transferring data blocks of variable size. The circuit provides an indication to one CPU that the other CPU has received all the data words transmitted.

7 Claims, 1 Drawing Figure

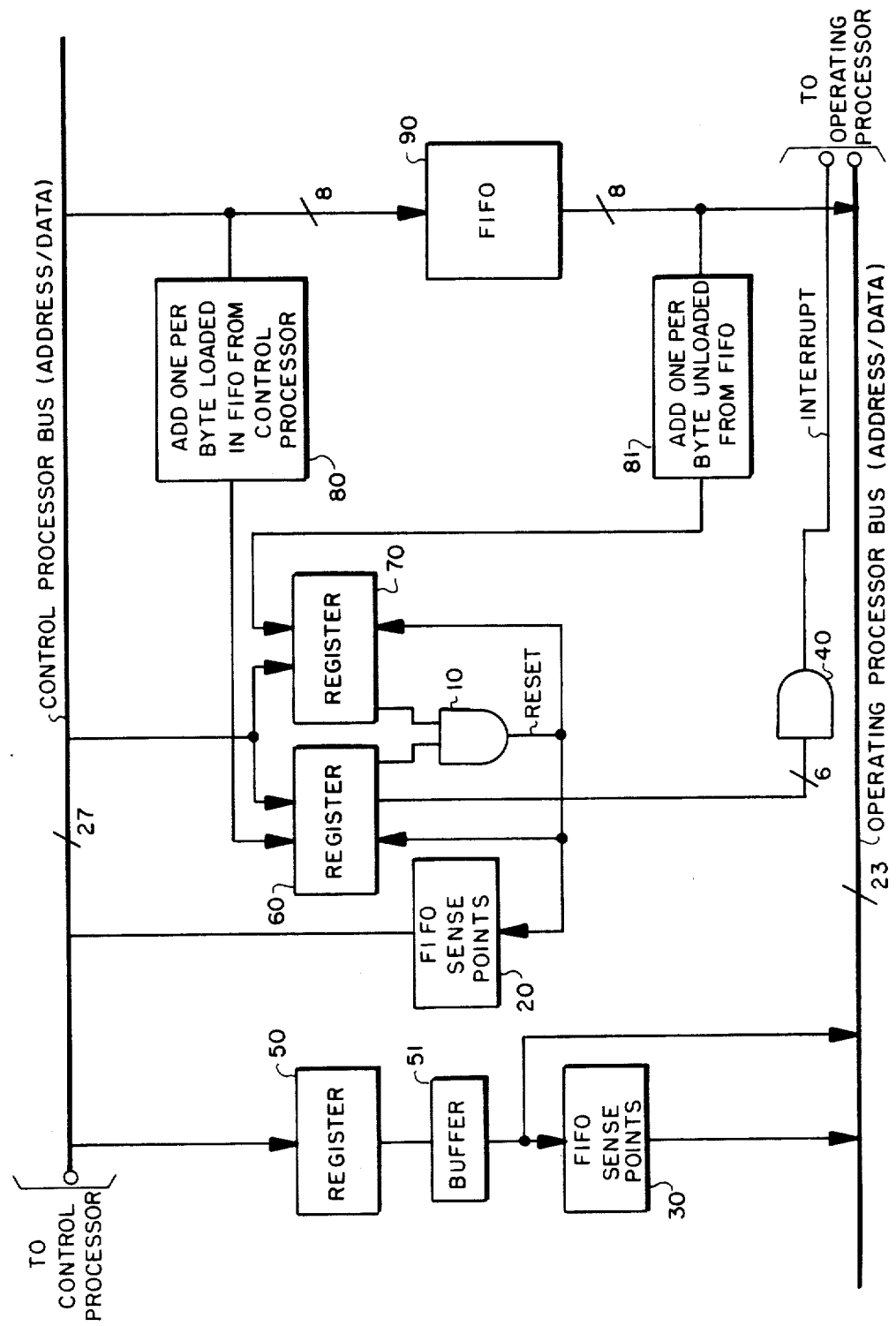

CIRCUIT FOR RELIABLE DATA TRANSFER BETWEEN TWO CENTRAL PROCESSING UNITS

BACKGROUND OF THE INVENTION

The present invention pertains to data transfer between central processing units and more particularly to a circuit for reliably controlling variable size data transmission between three central processing units.

Central processing units (CPUs) can transfer data to other CPUs at a high rate of speed, typically in the microsecond range. A simplified manner of accomplishing this data transfer is for both CPUs to cease any other processing and for one CPU to transmit and the other to receive data. This is very inefficient since both CPUs must simultaneously stop all other tasks in order to accomplish the data transfer. Buffering arrangements have been added between the CPUs in order to remove this inefficiency. As a result, the CPUs must indicate how much data is being transferred via the buffer. This indication is itself transmitted as a data word via the buffer. Buffer transmission of this indication is subject to errors and valuable data may be lost as a result.

A typical solution to this problem includes the addition of a single register which indicates the count of the number of data words being transferred. This register is then incremented by the transmitting CPU as data is put into the buffer and the register is decremented by the receiving CPU as data is removed from the buffer. This situation could result in simultaneous access of the two CPUs. As a result, the count of the number of data words may be in error.

Accordingly, it is the object of the present invention to provide a buffering circuit for reliable data transfer between CPUs.

SUMMARY OF THE INVENTION

A circuit for reliable data word transfer is connected between two central processing units (CPUs). Two CPU buses are respectively connected between the two CPUs and the circuit for reliable data word transfer. A buffer is connected to the two CPUs via the respective CPU buses. The buffer operates to store a particular number of data words received from the first CPU and to transmit these data words to the other CPU. The buffer has a maximum capacity of data words which can be stored in it at any particular time.

A first register is connected between the two CPUs and is operated to store a representation of the number of data words to be transferred between the CPUs. This numeric representation may be read out by the CPU which is to receive the data. The receiving CPU will then have an indication of the number of data words which it is to receive.

The second register apparatus is connected between the two CPUs and stores a representation of the difference between the number of data words to be transferred and the maximum capacity of data words of the buffer.

An adding arrangement is connected to the two CPUs and increments the stored representation of the second register for each data word which is stored into the buffer. In addition, the adding arrangement increments the second register for each data word which is transmitted to the second CPU from the buffer.

An indication apparatus is connected between the second register and the first CPU. This indication apparatus operates in response to the second register to generate an acknowledgement signal for the first CPU. This acknowledgement signal indicates that the particular number of data words stored in the buffer have been transferred to the second CPU.

DESCRIPTION OF THE DRAWINGS

The included single sheet of drawings is a schematic diagram embodying the principles of operation of a circuit for reliable data transfer between CPUs.

DESCRIPTION OF THE PREFERRED EMBODIMENT

Referring to the drawings, a control processor and operating processor are connected to the circuit for reliable data transfer via a control processor bus and an operating processor bus respectively. Each of these buses includes an address and data portion.

Register 50 is connected to the control processor via the control processor bus. Register 50 is connected to buffer 51. Buffer 51 is connected to FIFO sense points 30 and is also connected directly to the operating processor bus. FIFO sense points 30 are connected to the operating processor bus.

Registers 60 and 70 are connected to the control processor bus. Registers 60 and 70 are binary counters which contain a binary representation of the number of words to be transferred between the control processor and the operating processor. Register 60 is connected to six-input AND gate 40. Gate 40 is connected to the operating processor. Registers 60 and 70 are each connected to AND gating arrangement 10. The output of AND gating arrangement 10 is connected to registers 60 and 70 and to FIFO sense points 20 for resetting the sense points and registers to indicate that the data words have been received by the operating processor. FIFO sense points 20 are also connected to the control processor bus so that the control processor may read these indicators.

Add one circuit 80 is connected between register 60 and the control processor via the control processor bus. Add one circuit 81 is connected between register 70 and the operating processor via the operating processor bus.

FIFO (first in first out buffer device) 90 is connected between the control processor bus and the operating processor bus. The connections from the FIFO 90 to each of the buses are 8 bits in width. FIFO 90 has a maximum capacity of 64×8 bytes. Various other FIFO word size and word length may be used in the present invention. The control processor loads register 50 with a value indicating the number of bytes of data to be transferred to the operating processor. This value may be read by the operating processor directly through buffer 51. FIFO sense points 20 provide signals which indicate that the FIFO 90 is empty and not presently being used or contains data for transmission.

Next, the control processor calculates the value to load into registers 60 and 70. This value is obtained by subtracting the number of bytes to be transferred (a number between 1 and 64) from the FIFO size, which is 64 in this case. If, for example, 10 bytes of data are to be transferred from the control processor to the operating processor, register 50 is loaded with the value of 10 (the number of data words to transfer). Registers 60 and 70 are each loaded with the value 53 (63 − 10). The actual counting numbers 0 through 63 are used since a 6 bit counter is employed.

The control processor transfers one byte of data to FIFO 90 via the control processor bus. For each such data transfer, add one circuit 80 increments register 60 by one. Register 60 will then contain the binary equivalent of the number 63 which indicates that 10 words or bytes in this case have been transferred. When register 60 contains the value of 63, AND gate 40 operates to provide the operating processor with an interrupt signal via the interrupt lead. The operating processor responds by reading the number of words to transfer from register 50 through buffer 51. Next, the operating processor transfers one byte of data from FIFO 90. As a result, add one circuit 81 increments register 70 by one for each byte of data transferred. When 10 bytes of data have been transferred, register 70 will contain the binary value of 63. AND gating arrangement 10 will then operate in response to the binary value of 63 contained in each of registers 60 and 70 to produce a reset signal resetting registers 60 and 70 via the reset lead. In addition, the reset signal is transmitted via the reset lead to FIFO sense points 20 to reset them indicating that the operating processor has received 10 bytes of data. The control processor may then read these sense points. At that time, the control processor will reset the value of register 50.

FIFO 90 may be implemented with integrated circuits part no. 67401. Registers 60 and 70 may be implemented with at least two 4 bit binary counters integrated circuit part no. 74LS197. Register 50 may be implemented with HEX D-type flip-flops integrated circuit part no. 74LS174. Buffer 51 may be implemented with integrated circuit part no. 74LS224. Other gating arrangements shown may be implemented with standard integrated circuit packages. All the above integrated circuits are manufactured by the Texas Instruments Corporation and described in the Texas Instruments Data Book published by Texas Instruments Corporation.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A circuit for reliable data word transfer is connected between a first and a second CPU for said data word transfer between said CPUs, said circuit comprising:

first and second CPU buses respectively connected between said first and second CPUs and said circuit;

buffer means connected to said first and second CPUs via said first and second buses and said buffer means operated to store and to transmit a number of said data words from said first to said second CPU;

said buffer means having a maximum capacity of said data words;

first register means connected between said first and second CPUs and operated to store a representation of a particular number of said data words to be transferred from said first to said second CPU;

said second CPU operated to receive said stored representation of said particular number of data words;

second register means connected between said first and second CPUs and operated to store a representation of the difference between the number of said data words to be transferred and said maximum capacity of said data words of said buffer means;

adding means connected to said first and second CPUs and operated to increment said stored representation of said second register means for each data word stored and each data word transmitted by said buffer means; and indication means connected between said second register means and said first CPU, said indication means operated in response to said second register means to provide an acknowledgement signal to said first CPU for indicating said particular number of stored data words of said buffer means are transferred to said second CPU.

2. A circuit as claimed in claim 1, said second register means including:

a first and a second register, each connected to said first CPU and each operated to store said stored difference of said second register means; and first gating means connected to said first and second registers and to said indication means, said first gating operated to reset said first and second register means and operated to generate said acknowledgement signal by resetting said indication means.

3. A circuit as claimed in claim 2, said adding means including:

a first adder connected between said first CPU and said first register and operated to add one to said first register for each data word transferred from said first CPU to said buffer means; and a second adder connected between said second CPU and said second register and operated to add one to said second register for each data word transferred to said second CPU from said buffer means.

4. A circuit as claimed in claim 2, wherein there is further included second gating means connected between said first register and said second CPU to generate an interrupt signal indicating said buffer means has stored said particular number of data words.

5. A circuit as claimed in claim 1, wherein said buffer means includes a first in first out buffer device.

6. A circuit as claimed in claim 5, wherein there is further included a buffer connected to said first register means and to said second CPU via said second CPU bus.

7. A circuit as claimed in claim 6, wherein there is further included second indication means connected to said buffer, said second CPU and said first in first out buffer device and said second indication means is operated to provide first and second signals respectively for said buffer device being empty or for said buffer device storing said particular number of said data words.

* * * * *